Oct. 18, 1932.                N. M. GAGE                1,883,681
                      HEADLIGHT FOR MOTOR VEHICLES
                  Filed Nov. 18, 1930        2 Sheets-Sheet 1
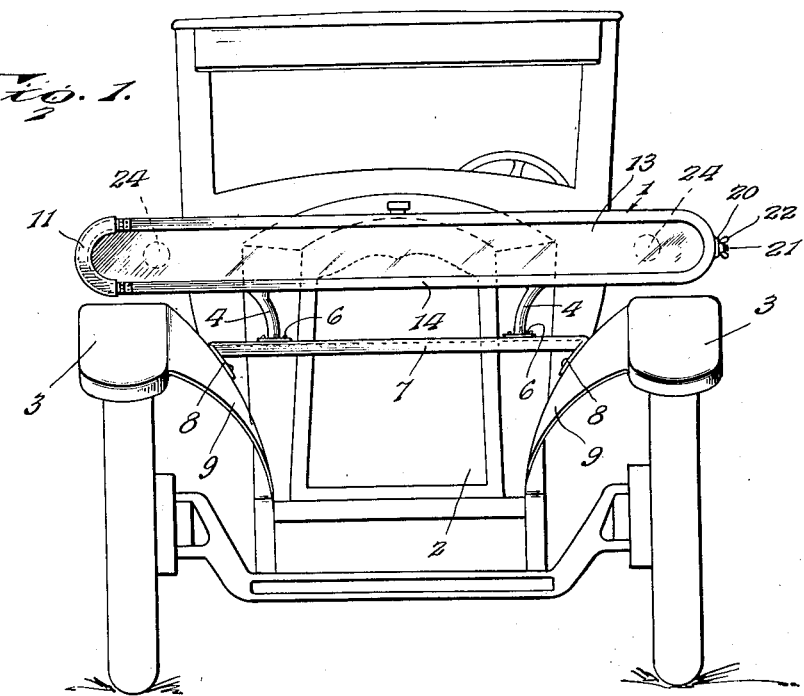
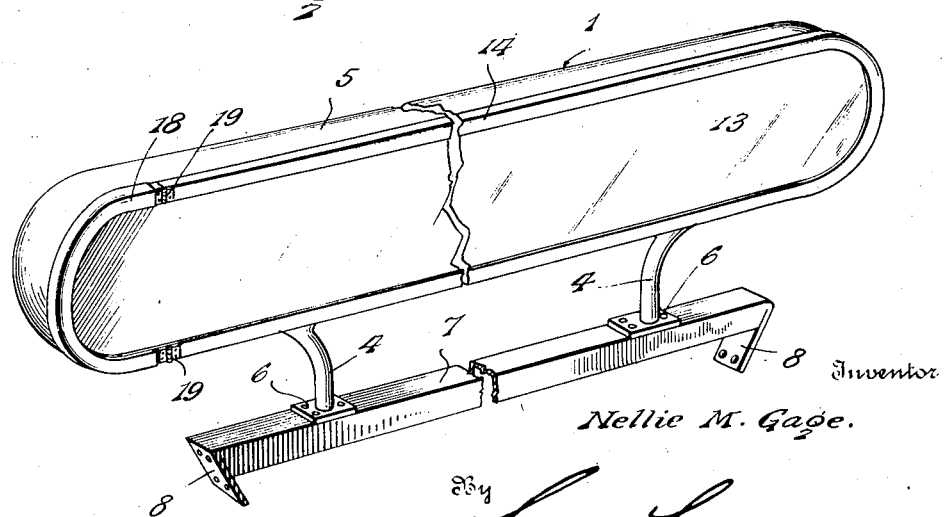
Inventor
Nellie M. Gage.
By Lacey & Lacey,
Attorneys

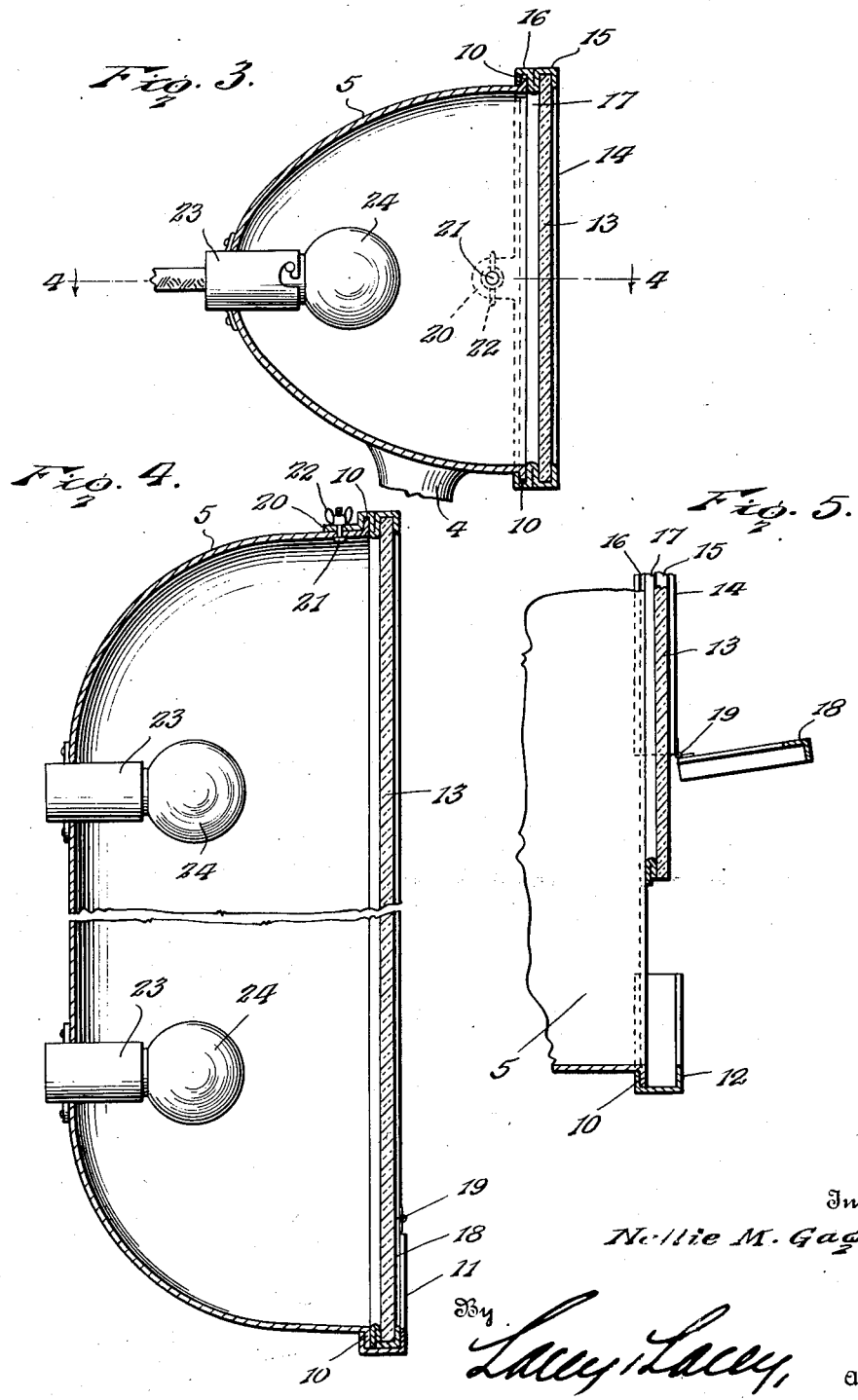

Patented Oct. 18, 1932

1,883,681

UNITED STATES PATENT OFFICE

NELLIE M. GAGE, OF DAYTON, OHIO

HEADLIGHT FOR MOTOR VEHICLES

Application filed November 18, 1930. Serial No. 496,465.

This invention relates to headlights for motor vehicles and one object of the invention is to provide a headlight which, when applied to an automobile, will be so positioned and of such construction that the road ahead of the automobile will be well illuminated and also forward end portions of the front mud guards, thereby permitting the driver of the automobile to have a well illuminated road in front of him when driving at night time and also permitting the driver of an approaching automobile to see the front portion of the automobile clearly and thereby eliminate danger of a collision due to misjudging the width of the automobile.

Another object of the invention is to provide a headlight extending transversely of the automobile in front of the radiator and having a casing of such construction that, while it is intended to be lighted by two bulbs mounted near its ends, it may be illuminated for its full length by a single bulb in case one of the bulbs should burn out and thereby prevent danger of an accident due to improper lighting when only one bulb is burning.

Another object of the invention is to provide the headlight with improved means for mounting it in front of the radiator which will serve not only as mounting means for the casing but also constitute a brace for the mud guards of the automobile.

Another object of the invention is to provide the headlight casing with an improved type of closure for its open front and so construct the closure that a frame forming a portion thereof and carrying a sheet of glass may be slidably engaged with the casing for movement into and out of operative engagement therewith.

Another object of the invention is to provide the closure frame with improved means for retaining the sheet of glass or other transparent material in its proper position in the frame and further provide improved means for retaining the glass securing device in its proper position when the closure is applied to the casing.

The invention is illustrated in the accompanying drawings, wherein

Figure 1 is a front elevation showing a headlight of the improved construction applied to an automobile, Fig. 2 is a perspective view of the improved headlight, Fig. 3 is a transverse sectional view through the headlight, Fig. 4 is a longitudinal sectional view through the headlight taken on the line 4—4 of Fig. 3, and Fig. 5 is a fragmentary view showing the closure in a partially closed position.

This headlight, which is indicated in general by the numeral 1, is mounted in front of the radiator 2 of the automobile and when in place extends transversely of the radiator in front of the upper portion thereof with ends of the headlight extending over the front mud guards 3. By this arrangement the headlight will not only serve to illuminate a road in front of an automobile but it will also illuminate the forward end portion of the front mud guards and permit them to be easily seen by the driver of an approaching automobile. Arms 4 extend downwardly from the casing 5 of the headlight and at their lower ends terminate in feet 6 which are riveted or otherwise firmly secured to a cross bar 7. This cross bar is formed of angle metal and has tongues 8 at its ends which are bent downwardly, as shown in Figure 2, so that when the headlight is applied these tongues may be riveted to the skirts 9 of the front mud guards and the bar serve not only as a support for the headlight but also as a brace for the mud guard.

The casing 5 of the headlight is of a trough-like construction, and by referring to Figures 3 and 4 it will be seen that this casing is open at its front and closed at its ends. Walls of the casing are bent outwardly at its open front to form a marginal flange 10 which extends entirely about the open front of the casing to form a track and at one end of the casing the outstanding flange is extended forwardly to form a seat 11. This seat is U-shaped as shown in Figures 1 and 2 and in cross section is of a channeled construction, as shown in Figures 4 and 5. It will be obvious that the seat may be formed from a separate strip of channel metal bent to assume the desired shape and riveted or otherwise firmly secured to the outstanding flange 10 at one end of the casing if so desired. A seat of this specific construction has been shown in Figure 5 and indicated by the numeral 12.

In order to close the open front of the casing, there has been provided a closure consisting of a sheet 13 formed of glass or other suitable material and a frame 14 in which the sheet 13 is mounted. The frame is of an open construction and is formed from a strip of metal bent to form front and rear pockets 15 and 16 separated from each other by a rib 17. The pocket 15 is of the proper dimensions to snugly receive the transparent sheet 13 and the pocket 16 is of such dimensions that the flanges or tracks 10 may be snugly received therein. Therefore, the flanges or tracks may be engaged in the pocket and the closure will be slidably mounted for movement longitudinally of the casing into and out of position to close the open front thereof. The rib 17 projects beyond the open ends of the pocket 15 and 16, as clearly shown in Figures 4 and 5, and, therefore, the sheet 13 when fitted into the pocket 15 may have one end portion projecting from this pocket and at the same time bear against the portion of the rib which projects from the pocket. This projecting portion of the rib is U-shaped when viewed in front elevation and extends about the margins of the projecting end portion of the transparent sheet. A keeper 18 which is also formed of metal and is U-shaped when viewed in front elevation has its arms hinged to the upper and lower portions of the frame 14 at the open ends of the pocket 15, as shown at 19, and this shield is formed of angle metal so that when it is closed it has contacting engagement with the outer face of the projecting end portion of the sheet 13 and also overlaps the marginal edges thereof. Therefore, the projecting end portion of the transparent sheet will be protected and there will be no danger of this projecting end of the sheet being broken by vibrations. When the closure is moved to a fully closed position, the shield is received in the seat 11, as shown in Figure 4, and since the outer walls of this seat overlap the outer face of the shield or retainer 18 it will be securely held in the closed position about the projecting end of the transparent sheet and prevent this transparent sheet from having movements longitudinally or transversely. Therefore, the transparent sheet will be firmly held in place and movements which might be caused by vibrations prevented. It will thus be seen that the transparent sheet will not be liable to easily break. By drawing the closure in an opening direction it can be easily disconnected from the casing and the shield or retainer moved to the position shown in Figure 5 in order to allow the transparent sheet to be withdrawn and thoroughly cleaned or a new one set in place if the one in use should become broken. A tongue 20 projects from the closed end of the casing and is perforated in order to receive a bolt 21 which projects outwardly from the closed end of the casing. This bolt engages through the opening in the tongue when the closure is moved to the closed position and by applying a fastener, such as the winged nut 22, the closure will be securely but releasably retained in a closed position. Sockets 23 of a conventional construction are carried by the casing. These sockets are located near ends of the casing and project forwardly with their front ends open and adapted to receive bulbs 24. Only two bulbs are necessary as the casing is unobstructed throughout its length and, therefore, light from either bulb may illuminate the entire interior of the casing. By this arrangement a road and the forward end portions of the front mud guards may be well illuminated and if one of the bulbs should burn out there will still be sufficient illumination to prevent danger of an accident due to improper lighting.

Having thus described the invention, I claim:

1. A headlight for motor vehicles comprising a casing open at its front and of sufficient length to extend across the front of a radiator with its ends projecting from opposite sides thereof, lamps in said casing spaced longitudinally thereof, flanges extending along margins of the open front of said casing, a closure for the open front of said casing consisting of a frame and a transparent sheet carried thereby, said frame being open at one end and formed with a channel to receive marginal portions of the sheet and with a second channel receiving said flanges and mount the closure for sliding movement longitudinally of the frame into and out of a closed position, a shield at the open end of said frame carried by the frame and movable into and out of position to engage about the adjacent end of said sheet, means carried by the casing to engage the shield and retain said shield in an operative position when the closure is closed, and means to releasably secure the closure closed.

2. A headlight for motor vehicles comprising a casing open at its front and of sufficient length to extend across the front of a radiator, lamps in said casing spaced longitudinally thereof, tracks extending along upper and lower edges of the open front of said casing, a closure for the open front of said casing consisting of a frame and a transparent sheet carried thereby, said frame being open at one end and closed at its other end and having its upper and lower portions slidably engaged with the tracks to mount the closure for movement into and out of closing relation to said casing, means to retain said sheet in engagement with said frame, a tongue projecting rearwardly from the closed end of said frame to overlap the adjacent end of said casing, a stem projecting from the said end of said casing to engage through said tongue, and a fastener carried by said stem to engage said tongue and releasably secure the closure.

3. A headlight for motor vehicles comprising a casing open at its front and of sufficient length to extend across the front of a radiator, lamps in said casing spaced longitudinally thereof, a closure for the open front of said casing consisting of a frame and a transparent sheet carried thereby, said frame being open at one end and formed with a channel to receive marginal portions of the sheet, means being provided to slidably connect said frame with said casing and mount the closure for movement longitudinally of the casing into and out of a closed position, a shield at the open end of said frame hinged thereto for movement into and out of position to engage about the adjacent end of said sheet, a channeled seat carried by said casing to engage about said shield and retain the shield in a closed position when the closure is closed, and means to releasably secure the closure closed.

In testimony whereof I affix my signature.

NELLIE M. GAGE. [L. S.]